United States Patent [19]

Shannon et al.

[11] 4,105,623

[45] Aug. 8, 1978

[54] METHOD OF MAKING MOLDING COMPOUNDS AND MATERIALS MADE THEREBY

[75] Inventors: Richard F. Shannon, Lancaster; Douglas L. Denton, Newark, both of Ohio

[73] Assignee: Owens-Corning Fiberglas Corporation, Toledo, Ohio

[21] Appl. No.: 751,568

[22] Filed: Dec. 17, 1976

[51] Int. Cl.² ............................................. C08K 7/14
[52] U.S. Cl. ....................................... 260/38; 156/335
[58] Field of Search ............... 260/38, 57 A; 264/134, 264/135, 145, 216; 156/324, 335

[56] References Cited

U.S. PATENT DOCUMENTS

| | | | |
|---|---|---|---|
| 939,966 | 11/1909 | Baekeland | 260/38 |
| 2,193,941 | 3/1940 | Seeback | 260/57 A X |
| 2,457,493 | 12/1948 | Redfern | 156/335 X |
| 3,652,352 | 3/1972 | Milsimer et al. | 156/335 X |
| 3,734,814 | 5/1973 | Davis et al. | 156/324 X |
| 3,784,433 | 1/1974 | Garnish et al. | 156/335 X |
| 3,888,716 | 6/1975 | Morse | 156/324 X |

*Primary Examiner*—Sandra M. Person
*Attorney, Agent, or Firm*—Ronald C. Hudgens; Patrick P. Pacella; William P. Hickey

[57] ABSTRACT

A method of making molding compounds and particularly sheet molding compounds in which a novolak is dispersed throughout an inorganic filler and a slight reaction is caused to take insitu with a hydrogen donor that is preferably hexamethylenetetramine to produce a molding compound. In the case of a sheet molding compound, the material is spread out into a thin sheet and inorganic fibers are embedded therein, following which a body-building reaction is initiated to liberate some ammonia. Thereafter, the material is dried and solidified into a solid handeable sheet molding compound.

There is also disclosed a method for forming the novolak resin insitu by reaction of the monomers while dispersed throughout the inorganic fillers.

25 Claims, 1 Drawing Figure

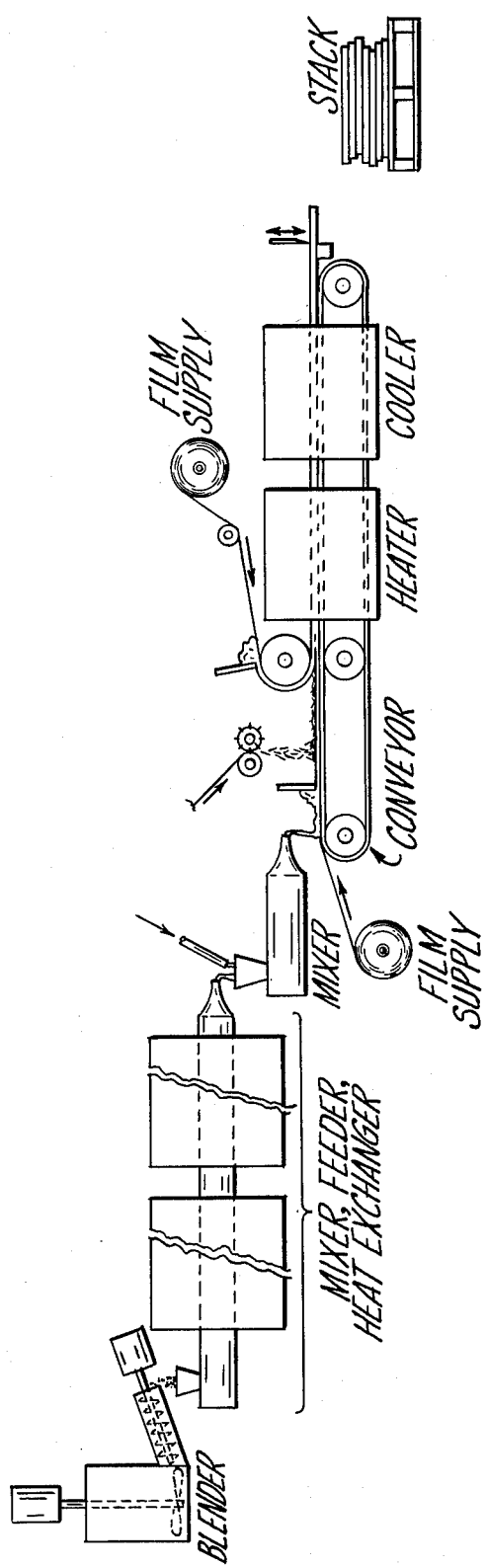

METHOD OF MAKING MOLDING COMPOUNDS AND MATERIALS MADE THEREBY

The present invention relates to a new and improved method of producing molding compounds from novolak resins, and more particularly to a new and improved process of making sheet molding compounds.

BACKGROUND OF THE INVENTION

Crosslinking prepolymers of aldehyde condensate resins are made by two different processes, one of which produces products called resoles, and the other of which produces products which are called novolaks. In the process for producing resoles, sufficient trihydrogen donating material is mixed with the aldehyde to be capable of completing the crosslinking of the condensates. The reaction is terminated, however, before the material reaches the B-stage, so that it is still water soluble and consequently viscous and sticky. When attempts are made to dry such resoles, particularly with heat, the reaction usually goes beyond the B-stage to produce some crosslinking, and therefore this process is not used commercially for molding compounds.

In the case of novolaks, the reaction between the aldehyde and the hydrogen donor, as for example phenol, is carried out with a deficiency of the aldehyde i.e. no more than a 1 to 1 mol ratio so that the reaction will be stopped without proceeding beyond the B-stage. These materials usually are dried and are ground into powders which are then mixed with further hydrogen accepting material, as for example hexamethylenetetramine or paraformaldehyde to produce a powderous mixture which can be fused and molded into a desired shape. During molding, crosslinking takes place to produce a thermoset or C-staged material. Novolak materials usually cost at least 1½ times that of resoles, but they have the advantage that they can be handled as powders and have a long shelf life.

We are aware that novolak resins have been used in conjunction with organic fillers, as for example saw dust; and further have been used with bulky light weight inorganic fillers, as for example asbestos, to produce molded articles, as for example brake lining. In the case of the reaction of the novolak with hexamethylenetetramine, ammonia is given off, and in all of the prior art processes including those mentioned above, the molded articles produced have been sufficiently porous to vent the ammonia that is generated without disrupting the molded shape. To our knowledge, no one has satisfactorily produced molded articles using novolaks filled with inorganic fillers, because of the problems that are created by the ammonia produced during molding.

An object of the present invention is the provision of a new and improved molding compound comprising a high density inorganic filler and a novolak which can be molded without blisters and cracking.

Another object of the present invention is the provision of a new and improved sheet molding compound and process of making same which utilizes novolak resins.

A further object of the present invention is the provision of a new and improved process wherein novolak resins are produced from monomer while dispersed throughout high density inorganic fillers, following which a hydrogen donor and particularly hexamethylenetetramine is blended therewith and formed into sheet molding compound.

Further objects and advantages of the present invention will become apparent to those skilled in the art to which the invention relates from the following description of the preferred embodiments.

BRIEF DESCRIPTION OF THE DRAWINGS

The solitary FIGURE of the drawings is a block diagram of equipment for performing the procedure of Example 1.

DESCRIPTION OF THE PREFERRED EMBODIMENTS

According to one embodiment of the invention, a trihydrogen donor and an aldehyde are mixed with dense inorganic filler powders utilizing an acid catalyst, and a 1 to 1 mol ratio of the aldehyde to trihydrogen donor. A reaction of these monomers while dispersed throughout the inorganic fillers is preferably carried out in a continuous process involving a slow continuous mixing to provide good heat transfer and a controlled reaction. Because no more than a 1 to 1 mol ratio of the reaction is utilized, the reaction will automatically stop at the B-stage; and when carried out in a continuous process in a long enclosure, the B-staged condensate will be a solid dispersed throughout, and generally on the surface of the filler with sufficient water remaining to provide a plastic mix. After the exotherm has taken place and the material is cooled, sufficient hexamethylenetetramine is blended into the mixture so that the resin can be completely crosslinked, if so desired. The temperature after the hexamethylenetetramine is added, however, is controlled and the material is kept at a sufficiently low temperature, so as to minimize further reaction. The paste is then spread into a thin sheet, glass fibers are embedded therein, and the sheet molding compound so made is dried using just sufficient temperature as will provide a controlled liberation of ammonia with some methylol formation to provide a compound having optimum molding characteristics. The sheet molding compound so produced is a solid handleable sheet in which some decomposition of the hexamethylenetetramine has already taken place, with volatile ammonia vented therefrom to thereby avoid the problem that is produced when large amounts of volatile materials are liberated during molding operations. This process makes it possible to produce molded articles that are filled with nonporous, high density inorganic fillers without the production of troublesome blisters and disruptions during the molding operation.

EXAMPLE 1

A plastic mix is made of the following materials in parts by weight, using the procedure shown in the drawing:

| Materials | Parts by Weight |
| --- | --- |
| Calcium carbonate | 450 |
| Phenol | 100 |
| Formalin (52%) | 65 |
| Mold release agent | 10 |

The powders including the mold release agent, phenol and calcium carbonate are blended together, and the liquid formalin and acid are thereafter incorporated therewith. The plastic mix so provided is then placed into a long tubular auger type heat exchanger, the inlet half of which is jacketed for steam, and the outlet half of which is jacketed for cold water. The auger slowly moved the material through the heat exchanger and the amount of steam added to the jacket is controlled to produce a controlled exotherm at approximately 85° C. The material then passes to the cooling section of the exchanger where the temperature of the material is brought down to approximately room temperature. The paste exiting from the heat exchanger then flows to another tubular mixer where 20 parts by weight of hexamethylenetetramine are added and blended therewith in a continuous manner. The material exiting from this mixer is extruded onto a moving belt to provide a layer approximately ⅛-inch thick. A layer of chopped fibers is added thereto and another layer of paste approximately ⅛-inch thick is brought down upon the layer of chopped fibers and the resulting sandwich is fed through a pair of rollers which presses the two layers of paste together around the fibers to embed the fibers in the paste. The sheet molding compound so produced then passes through a heated vacuum chamber to dry the sheet molding compound, and simultaneously produce a reaction of the hexamethylenetetramine with the novolak resin. Hexamethylenetetramine, of course, is completely soluble in the water phase, so that it is easily distributed uniformly throughout. Since the sheet molding compound is not held under pressure, the water and ammonia liberated by the partial reaction is easily extracted and the heat produced fuses the B-staged condensate together. By the time the product is dry, the B-staged resin bonds the inorganic fillers into a rigid handleable sheet in which the binder has not as yet been C-staged. The sheet molding compound so produced can then be molded in the usual manner under heat and pressure without the liberation of the large amounts of ammonia and water that usually accompany the molding of powdered novolak molding compound. The SMC can also be made by substituting paraformaldehyde for the formalin.

It will be seen that from the above Example, strong alkalis such as calcium hydroxide have not been used as a catalyst and this is a further advantage where glass fibers that are subject to alkali attack are desired to be used as a reinforcement.

EXAMPLE 2

As previously indicated, novolaks are B-staged materials, which, therefore, are insoluble in water. It has now been discovered, however, that if a novolak is mixed with a strong base in the presence of water, that it can be solubilized at least to a degree wherein it will make an acceptable paste for making sheet molding compounds. A plastic mix was made of the following materials given in parts by weight in a Hobart Mixer:

| Material | Parts by Weight |
| --- | --- |
| Portland cement (filler) | 7500 |
| Water | 2500 |
| Novolak mix (15% Hexamethylenetetramine) (Hooker 12763) | 2500 |
| Zinc Stearate (Mold Release Agent) | 100 |
| Gammaminopropyltrimethoxy silane (Coupling Agent) | 20 |
| Tetra ethylorthosilicate | 20 |

After a short period of mixing in the Hobart Mixer there was a slight temperature rise and the materials after a period of mixing took on a smooth creamy appearance indicating that the novolak resin had been solubilized. A sheet molding compound was then made from the mixture by spreading the material onto a polyethylene sheet with a doctor blade using a blade setting of 0.050 inch. Thereafter, 50 grams per square foot of chopped glass fiber strands that were 1-inch long, were placed thereon, and a second layer of the paste that had been applied to a second polyethylene sheet was brought down on top of the layer of glass fibers and the sandwich so produced was passed between a pair of rollers to embed the glass fibers in the layers of molding compound. The sandwich so produced was then aged for 2 days during which time the material set up into a sheet of molding compound that was sufficiently solid that the top and bottom polyethylene sheets could be removed therefrom. The sheet molding compound so produced was then placed in a heated press to 300° F and molded at 2000 lbs. per sq. in. Prior to doing so, however, the material was placed in a microwave oven for 5 minutes and preheated to approximately 300° F to produce a partial reaction of the hexamethylenetetramine that was in the novolak resin mixture. Prior to compressing the material at the full pressure, however, the hot surfaces of the mold were brought down onto the surface of the sheet molding compound 6 times to thoroughly heat the material and liberate gases therefrom before the full 2000 psi pressure was utilized. Using this procedure, rectangular panels 5 inches × 10 inches were produced. These panels had the following properties:

Flexual Strength — 17,000 psi
Flexual Modulus — 3,800,000 psi
Tensile Strength — 6,400 psi
Tensile Modulus — 3,600,000 psi
Notched Izod Strength — 5.8 foot lbs. per inch

EXAMPLE 3

The amount of drying that is necessary to convert the molding compound paste into a handleable solid state can be reduced by using an alcohol in place of some or all of the water that is used in pasting the materials. A plastic mix is made from the following materials in parts by weight using the procedure given in Example 2:
Novolak Resin Mix (15% Hexamethylenetetramine) — 4,900 parts
Calcium Carbonate (Snowflake) — 13,500 parts
Zinc Stearate — 200 parts
Gamma Amino Propyltrimethoxy Silane — 20 parts
Ethanol — 1,925 parts A sheet molding compound was made using the same procedure given in Example 2, excepting that the sandwich was cut and dried in an oven at 110° C for 20 minutes to remove water and alcohol. The sheet molding compound so produced was then molded at 2000 psi at 300° F as given in Example 2, and the panels so produced had the following properties:
Flexual Strength — 25,000 psi
Flexual Modulus — 2,800,000 psi
Tensile Strength — 9,300 psi
Notched Izod Impact — 9.0 foot pounds per inch After samples of the panels were boiled for 24 hours in water, they had the following strengths:
Flexual Strength — 21,000 psi
Flexual Modulus — 2,400,000 psi
Tensile Strength — 8,400 psi
Notched Izod Impact — 6.4 foot pounds per inch It will now be apparent that the procedures of the present invention will have utility in the production and compression molding of any molding compound that utilizes a dry B-staged resin and a crosslinking monomer, therefore, and which produces troublesome gases during the compression molding operation. The invention has particular advantages in molding compound that utilize aldehyde condensate binders, as for example solid B-staged condensates of materials having at least 3 labile, or active hydrogens which react with the aldehyde material to produce crosslinked resin. Such materials will hereinafter be called trihydric materials even though they contain more than 3 labile hydrogens. These materials will include the phenols, such as: phenol, resorcinol, 3-5 xylenol, catechol, phloroglucinol, etc., as well as urea, melamine, dicyandiamide, etc.

Any suitable aldehyde can be used as for example formalin, (preferably a 52% aqueous solution of formaldehyde) paraformaldehyde, acetaldehyde, propionaldehyde, isobutylaldehyde, glyoxal, furfural, etc.

The above mentioned aldehydes and trihydric materials are reacted to a B-stage wherein they are fusible, and generally non-water soluble unless solubilized by a strong base as taught above. B-staged materials can be formed by reacting the aldehyde and trihydrogen donor in mol ratios of less than 1.25 to 1, and preferably no more than approximately 1 to 1, so that the materials can be dried without appreciable danger of crosslinking. In the present methods, B-staged materials are utilized to hold the sheet molding compound together in handleable sheet form. A crosslinking monomer as for example, hexamethylenetetramine is mixed with the B-staged resin powders and fillers, and preferably is partially reacted with the B-staged material prior to being molded in a heated press to liberate some of the troublesome gases, before the compound is compression molded. As previously indicated, the liberation of water and/or ammonia from non-porous fillers during compression molding may cause blisters and disruptions to be produced in the finished molded article. The procedures of the present invention, therefore, have particular advantages when the molding compounds comprise more than 50% by weight of high density particulate inorganic fillers, as for example, calcium carbonate, silicate flour, calcium alumina cements, portland cement, etc. The preferred molding compound of the invention will comprise from about 50% by weight to about 90% by weight of the particulate inorganic fillers.

Preferred materials will substitute inorganic fibers for a part of the fillers, and these fibers will, of course, include: glass fibers, mineral wool, silicon carbide fibers, etc. The molding compound containing at least 50% inorganic particulate fillers may include up to about 30% by weight of inorganic fibers and still be moldable. The preferred materials will comprise from approximately 60% to approximately 75% by weight of particulate fillers and fibers which percentages will include fibers in an amount of from approximately 10% to approximately 30% by weight of the molding compound.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

We claim:

1. A new and improved method of producing molding compounds comprising: mixing an inorganic filler with monomers for producing an aldehyde condensate utilizing a mole ratio of the monomers that provides a deficiency of the aldehyde, reacting the monomers in-situ under acid conditions to produce an exotherm and generally B-stage the reactants, mixing sufficient gas producing crosslinking agent into the mixture for C-staging the reactants at a later time, spreading the mixture in a thin sheet, embedding inorganic fibers into the sheet, partially reacting the materials to liberate gases but without carrying the reaction to the C-stage, stopping the reaction, and aging the sheet to cause a thickening reaction which provides a solid handleable sheet molding compound.

2. The method of claim 1 wherein a solid trihydric material and formalin are mixed with the inorganic fillers and reacted to produce the B-stage material.

3. The method of claim 2 wherein the trihydric material is a phenol and a novolak is produced insitu on the inert filler.

4. The method of claim 1 wherein the aldehyde is paraformaldehyde and the trihydric material is a phenol to produce a novolak insitu on the inert filler.

5. The method of claim 1 wherein said fibers are glass fibers.

6. The method of claim 1 wherein said fibers comprise from approximately 10% to approximately 25% by weight of the molding compound with the total amount of the particulate fillers and fibers comprising from approximately 60% to approximately 75% by weight of the molding compound.

7. The method of claim 3 wherein said crosslinking agent is hexamethylenetetramine.

8. The method of claim 4 wherein said crosslinking agent is hexamethylenetetramine.

9. The method of claim 1 wherein said inorganic fillers comprise from 50% to 90% of the filler-monomer mixture.

10. A new and improved method of producing molding compounds comprising: mixing an inorganic filler with a novolak resin, an inorganic base, a crosslinking agent and water to solubilize the novolak and form a paste, forming a sheet molding compound of the paste, aging the compound until the compound sets to a handleable state, and heating and drying the sheet molding compound to liberate water and partially activate the crosslinking agent without C-staging the resin prior to molding.

11. The method of claim 10 wherein said crosslinking agent is hexamethylenetetramine.

12. The method of claim 11 wherein said inorganic fillers comprise from 50% to 90% of the filler-monomer mixture.

13. A new and improved method of producing molding compounds comprising: mixing an inorganic filler with a novolak resin, a crosslinking agent and a solvent to substantially completely wet out the filler and form a novolak-filler paste, forming a sheet molding compound of the paste, heating and drying the sheet molding compound to liberate water and partially activate the crosslinking agent without C-staging the resin, and aging the sheet molding compound to cause the partially activated crosslinking agent to cure the sheet molding compound to a handleable state.

14. The method of claim 13 wherein said crosslinking agent is hexamethylenetetramine.

15. The method of claim 13 wherein said inorganic fillers comprise from 50% to 90% by weight of the filler-monomer mixture.

16. The method of claim 14 wherein said inorganic fillers comprise from 50% to 90% by weight of the filler-monomer mixture.

17. The method of claim 15 wherein said filler includes inorganic fibers in an amount of from 10% to 30%/wt. inorganic fiber.

18. The method of claim 17 wherein said fibers are glass fibers.

19. A new and improved method of producing molding compounds comprising: mixing an inorganic filler, a phenol, formalin, and an acid catalyst to produce a novolak resin insitu on said filler, mixing hexamethylenetetramine with said acid novolak filler mixture, heating said mixture to partially activate said hexamethylenetetramine, stopping the reaction before C-staging the resin, and aging the mixture to allow the partially activated hexamethylenetetramine to convert the mixture to a handleable state.

20. The method of claim 19 wherein said filler comprises more than 50% by weight of the filler novolak mixture.

21. The method of claim 20 wherein the hexamethylenetetramine, novolak and filler are formed into a sheet molding compound, and the sheet molding compound is heated to partially react the hexamethylenetetramine with the novolak.

22. The sheet molding compound prepared by claim 21.

23. A molding compound comprising: a major percentage by weight of a powderous inorganic dense filler substantially completely wetted out by a minor percentage of a novolak resin, said wetted filler being mixed with hexamethylenetetramine and heated to partially activate the hexamethylenetetramine without C-staging the novolak resin.

24. The molding compound of claim 23 including from approximately 10% to approximately 30%/wt. inorganic fiber.

25. The molding compound of claim 24 wherein said fibers are glass fibers.

* * * * *